United States Patent [19]

Watanabe

[11] 4,203,492

[45] May 20, 1980

[54] METHOD FOR ACIDIZING SILICEOUS MATERIALS CONTAINED IN HIGH TEMPERATURE FORMATIONS

[75] Inventor: David J. Watanabe, Orange, Calif.

[73] Assignee: Union Oil Company of California, Brea, Calif.

[21] Appl. No.: 14,054

[22] Filed: Feb. 22, 1979

Related U.S. Application Data

[63] Continuation-in-part of Ser. No. 885,450, Mar. 10, 1978, Pat. No. 4,148,360.

[51] Int. Cl.$^2$ .................... E21B 43/26; E21B 43/27
[52] U.S. Cl. .................... 166/300; 166/307; 166/308; 252/855 C
[58] Field of Search ............... 166/271, 281, 300, 307, 166/308

[56] References Cited

U.S. PATENT DOCUMENTS

| | | |
|---|---|---|
| 1,916,122 | 6/1933 | Grebe . |
| 2,059,459 | 11/1936 | Hund et al. . |
| 2,124,530 | 7/1938 | Loomis et al. . |
| 2,259,428 | 10/1941 | Shelley . |
| 2,265,923 | 12/1941 | Normand . |
| 2,300,393 | 11/1942 | Ayers . |
| 2,358,665 | 9/1944 | Shapiro . |
| 2,663,689 | 12/1953 | Kingston et al. . |
| 2,765,851 | 10/1956 | Bond . |
| 3,215,199 | 11/1965 | Dilgren . |
| 3,288,216 | 11/1966 | Blickensderfer et al. . |
| 3,297,090 | 1/1967 | Dilgren .................... 166/307 X |
| 3,307,630 | 3/1967 | Dilgren et al. . |
| 3,379,249 | 4/1968 | Gilchrist et al. . |
| 3,481,398 | 12/1969 | Prats .................... 166/251 |
| 3,605,899 | 9/1971 | Tate et al. .................... 166/300 |
| 3,695,354 | 10/1972 | Dilgren et al. .................... 166/272 |
| 3,828,854 | 8/1974 | Templeton et al. .................... 166/307 |
| 3,868,998 | 3/1975 | Lybarger et al. .................... 166/278 |
| 3,938,593 | 2/1976 | Friedman .................... 166/307 |
| 4,027,731 | 6/1977 | Smith et al. .................... 166/267 |
| 4,136,739 | 1/1979 | Salathiel et al. .................... 166/300 |

OTHER PUBLICATIONS

Thomas et al., "Matrix Treatment Employs New Acid System for Stimulation and Control of Fines Migration in Sandstone Formations," SPE Paper 7566, Oct. 1978.

*Primary Examiner*—Stephen J. Novosad
*Assistant Examiner*—George A. Suchfield
*Attorney, Agent, or Firm*—Dean Sanford; Daniel R. Farrell

[57] ABSTRACT

An aqueous fluoride salt solution and a substantially anhydrous acid precursor are introduced through a well into a high temperature subterranean formation containing siliceous materials. The acid precursor, which is a normally liquid halogenated hydrocarbon having one or two carbon atoms, hydrolyzes in situ to generate a hydrohalic acid which combines with the fluoride salt to acidize the siliceous materials.

29 Claims, No Drawings

METHOD FOR ACIDIZING SILICEOUS MATERIALS CONTAINED IN HIGH TEMPERATURE FORMATIONS

RELATED APPLICATION

This is a continuation-in-part of application Ser. No. 885,450, filed Mar. 10, 1978, now U.S. Pat. No. 4,148,360.

BACKGROUND OF THE INVENTION

1. Field of the Invention

This invention relates to a method for treating a subterranean formation penetrated by a well, and more particularly concerns a method for acidizing siliceous materials contained in relatively high temperature subterranean formations penetrated by a well.

2. Description of the Prior Art

Acidization of wells is a well-known process for increasing or restoring the permeability of subterranean formations so as to facilitate the flow of formation fluids, such as oil, gas or a geothermal fluid, from the formation into the well and also to facilitate the injection of fluids through the well into the formation. Acidization involves treating the formation with an acid, typically hydrochloric acid, in order to dissolve clogging deposits, such as carbonate scale, thereby opening pores and other flow channels and increasing the permeability of the formation. Hydrofluoric acid or a mixture of hydrofluoric and hydrochloric acids, commonly known as "mud acid", is typically employed to dissolve siliceous materials.

Numerous acidization methods have been proposed to cope with varying well conditions and special formation problems. However, in recent years the increased activity in drilling very deep oil and gas wells and geothermal wells has outpaced the development of suitable acidization methods, primarily due to the high temperatures of these formations.

A problem common to all the prior art acidization processes is the corrosion of the well equipment, particularly the downhole tubing and casing, which is exposed to the acidizing fluid. Because the reactivity of an acid is significantly increased at higher temperatures, the corrosion of well equipment is especially serious in the acidization of high temperature formations.

Corrosion inhibitors are generally incorporated into the acidizing fluid prior to its injection into the well. However, the effectiveness of the known corrosion inhibitors decreases at higher temperatures, and the expense of the corrosion inhibitors, which is significant even at low temperatures, becomes prohibitive at temperatures above about 250° C. Another difficulty with the known corrosion inhibitors, especially when used in the large quantities required in high temperature wells, is their tendency to form insoluble solids upon reaction with formation materials, thereby damaging the formation.

Another problem encountered during the acidization of high temperature formations is that the acid is rapidly consumed by the reactive material immediately adjacent the borehole before the acid can penetrate any significant distance into the formation. Without adequate formation penetration, the acidization operation is of little value. In view of these problems, the prior art acidization methods are limited, as a practical matter, to acidizing formations having temperatures on the order of 250° F. and less. Thus, there exists a need for a method for acidizing high temperature subterranean formations.

Accordingly, it is a principal object of this invention to provide a method for acidizing high temperature subterranean formations.

Another object of the invention is to provide an acidization method which results in no more than an acceptable rate of corrosion of metal well equipment.

Still another object of the invention is to provide a simple but effective method for acidizing siliceous materials contained in subterranean formations having temperatures on the order of 250° F. to 700° F. and higher, which method results in little or no corrosion of the well hardware.

Yet another object of the invention is to provide an acidization method for high temperature formations which does not require the use of corrosion inhibitors or other expensive chemical additives.

A further object of this invention is to provide an acidization method in which noncorrosive, nonscaling, acid precursors are displaced through a well and into a high temperature formation, wherein the acid precursors react in situ to generate hydrohalic acids.

A further object of this invention is to provide a method for acidizing those siliceous materials contained in portions of high temperature formations which are relatively remote from a borehole.

Another object of this invention is to provide a method for simultaneously acidizing and hydraulically fracturing a high temperature subterranean formation.

Still further objects, advantages and features of the invention will become apparent to those skilled in the art from the following description.

SUMMARY OF THE INVENTION

Briefly, the invention provides an improved method for acidizing siliceous materials contained in subterranean formations having temperatures between about 250° F. and about 700° F., wherein (1) a substantially anhydrous treating fluid consisting essentially of an acid precursor and (2) an aqueous fluoride salt solution are introduced through a well and into contact with the formation. The injected fluids are displaced from the well into the formation wherein the acid precursor hydrolyzes in situ to generate a hydrohalic acid which in turn converts the fluoride salt solution into a hydrofluoric acid solution.

The acid precursor is a normally liquid, halogenated hydrocarbon having a generalized formula:

$$C_xH_yX_z$$

wherein
 x=1 or 2;
 y=0, 1 or 2, but $y \leq x$; and
 z=2x−y+2, and
which is thermally stable under the high temperature and pressure conditions to which it is exposed prior to hydrolysis.

The method of this invention is useful in acidizing those subterranean formations in which the prior art acidization methods are rendered impractical due to the high formation temperatures. The invention provides an acidization method for high temperature formations in which corrosion of well equipment is substantially eliminated and the undesirable consumption of acid by the formation immediately adjacent the borehole is avoided. The method can be employed in high temperature formations having a large connate water concentration, such as a formation containing an aqueous geothermal fluid, or in high temperature formations having little or no connate water. The method has the advantage of being operable with conventional well equipment and does not require the use of exotic alloys or other materials to avoid corrosion of the well equipment.

DETAILED DESCRIPTION OF THE INVENTION

The method of this invention is suitable for acidizing siliceous materials contained in relatively high temperature formations and finds particular utility in acidizing siliceous materials contained in formations having temperatures on the order of 250° F. and higher, especially between about 250° F. and about 700° F.

The aqueous fluoride salt solutions suitable for use in the method of this invention are noncorrosive aqueous solutions of water-soluble alkali metal and/or ammonium fluoride salts. The fluoride salt must be capable of dissociating in situ to provide fluoride ions for the in situ generation of hydrofluoric acid. Suitable fluoride salts include the water-soluble alkali metal and/or ammonium salts of hydrofluoric acid, fluoroboric acid, hexafluorophosphoric acid, difluorophosphoric acid and fluorosulfonic acid. Preferred fluoride salts include ammonium fluoride, ammonium bifluoride, ammonium fluoroborate, ammonium hexafluorophosphate, ammonium difluorophosphate, ammonium fluorosulfonate, cesium fluoride, cesium bifluoride, cesium hexafluorophosphate, cesium difluorophosphate and cesium fluorosulfonate. These ammonium and cesium salts are preferred because the ammonium and cesium fluorosilicate salts formed in situ upon acidization of siliceous materials are relatively water-soluble as compared to the corresponding sodium, potassium and rubidium salts. Where sodium, potassium or rubidium fluoride salts are to be used, suitable precautions known in the art must be taken to avoid excessive precipitation of the corresponding fluorosilicate salts. For example, an overflush fluid, such as water, may be injected to displace these salts away from the vicinity of the well before they are precipitated.

Aqueous solutions of ammonium fluoride are particularly preferred due to their low cost and noncorrosivity, and aqueous solutions of ammonium fluoroborate are particularly preferred under circumstances in which the fluoroborate anion will serve to fuse movable formation fines and/or to desensitize clay particles. However, at very high temperatures, depending upon the pressure, ammonia gas may evolve from these aqueous solutions, which evolution has the effect of causing the solutions to become corrosive. In most cases the ammonia evolution can be controlled by pressurizing the fluoride salt solution. Where the ammonia evolution can not be controlled or where the ammonium ssalts are otherwise deemed unsuitable, the use of the corresponding cesium salt is preferred.

The concentration of the fluoride salt in the aqueous solution may vary widely depending, inter alia, upon the desired hydrofluoric acid concentration in the acid solution produced in situ and whether the injected fluids will be diluted with connate water and/or water otherwise injected into the formation. Where no dilution of the fluoride salt solution is expected, the fluoride salt concentration is preferably sufficient to provide a fluoride ion concentration between about 0.1 and about 25 weight percent, more preferably between about 1 and about 10 weight percent. Conversely where substantial dilution of the injected solution is expected a proportionately higher concentration is needed in the injected solution to yield the desired fluoride ion concentration in the acid solution produced in situ.

For obvious reasons, the aqueous fluoride salt solution injected through the well must itself be noncorrosive. As used herein, the term "noncorrosive" is meant to exclude solutions which cause an unacceptable amount of corrosion in the injection equipment. For the purposes of this invention, an aqueous fluoride salt solution is noncorrosive if, during its passage through the well into the formation, it does not cause an unacceptable rate of corrosion of the injection equipment. Preferably, an aqueous fluoride salt solution is selected and the injection operation is controlled such that the injection of the fluoride salt solution results in less corrosion than about 0.05 pounds per square foot. The addition of water-soluble buffering agents or corrosion inhibitors to the fluoride salt solution is contemplated where necessary to reduce its corrosivity, however, care must be taken not to introduce any material which will adversely react with or precipitate in the formation. Suitable noncorrosive aqueous fluoride salts solutions are known in the art.

The acid precursor suitable for use in the method of this invention is a normally liquid, halogenated hydrocarbon having one or two carbon atoms per molecule. More specifically, the acid precursor is a normally liquid halogenated hydrocarbon having the generalized formula:

$$C_xH_yX_z$$

wherein
x = 1 or 2;
y = 0, 1 or 2, but y ≤ x; and
z = 2x − y + 2, and which is thermally stable under the high temperature and pressure conditions to which it is exposed prior to hydrolysis.

The term "thermally stable" as used herein is meant to exclude compounds which spontaneously decompose and/or polymerize under the temperature and pressure conditions to be encountered. Halogenated hydrocarbons which thermally decompose under the conditions encountered prior to hydrolysis are to be avoided since some of the decomposition products, such as chlorine, are highly toxic, and other of the decomposition products, such as a tar resulting from the pyrolysis of halogenated hydrocarbons having three or more carbon atoms per molecule, tend to form plugging deposits which are difficult to remove.

The term "normally liquid" as used herein includes those compounds which exist as liquids under the ambient temperature and pressure conditions at the well site. In general, a compound which is "normally liquid" for the purpose of this invention has a normal melting point less than about 80° F., preferably less than about 30° F., and has a normal boiling point above about 80° F., preferably above about 120° F. Normally liquid compounds are more easily handled at the well site and more easily injected through a well into the subterranean formation in the method of this invention. The term "normally liquid" is meant to exclude compounds which exist only as a solid or a gas under the temperature and pressure conditions to which they will be exposed during handling at the well site and introduction into the well.

The treating fluid injected through a well in the method of this invention should consist essentially of the acid precursor or a mixture of acid precursors, and not contain any more than a minor amount of other materials such as water, hydrocarbons, surfactants or other materials which would significantly affect the rate of hydrolysis of the acid precursor. The addition of surfactants and/or other hydrocarbon additives to the treating fluid retards the rate and degree of hydrolysis of the acid precursor and the presence of these compounds at very high temperatures often results in the production of pyrolytic products which damage the formation. The presence of oxygen-containing compounds, including oxygen-containing hydrocarbon solvents, such as alcohols and ketones, must be avoided since at high temperatures these compounds are often corrosive even in an anhydrous state.

As discussed above, polymerizable or pyrolyzable compounds must be avoided in the acidization method particularly in very high temperature wells. Accordingly, unsaturated halogenated hydrocarbons must also be avoided. Halogenated hydrocarbons having three or more carbon atoms, and at very high temperatures two or more carbon atoms, tend to hydrolyze to form polymerizable and/or pyrolyzable side reaction products, such as propylene and acetic acid, respectively, and must therefore also be avoided. It is also preferable to avoid compounds which are flammable or explodable under the temperatures and pressure conditions to which they are exposed during handling at the well site.

The halogenated hydrocarbons having one carbon atom per molecule which are suitable for use as the acid precursor in the method of this invention include the normally liquid compounds having the general formulas $CX_4$ or $HCX_3$ which are thermally stable under the temperature and pressure conditions to be encountered. Suitable compounds of the formula $CX_4$ include: tetrachloromethane, fluorotrichloromethane, bromotrichloromethane and dibromodichloromethane. Suitable compounds of the formula $HCX_3$ include: trichloromethane, tribromomethane, chlorodibromomethane, bromodichloromethane, iododibromomethane, chlorodiiodomethane, iododichloromethane and fluorochlorobromomethane.

The halogenated hydrocarbons having two carbon atoms per molecule which are suitable for use as the acid precursor in the method of this invention include the normally liquid compounds having the general formulas $C_2X_6$, $HC_2X_5$ and $H_2C_2X_4$ which are thermally stable under the temperature and pressure conditions to be encountered. Suitable compounds of the formula $C_2X_6$ include: 1,2-difluorotetrachloroethane, 1,1,2-trifluorotrichloroethane and 1,1,2-trifluorotribromoethane. Suitable compounds of the formula $HC_2X_5$ include: pentachloroethane, fluorotetrachloroethane, fluorotetrabromoethane, difluorotribromoethane, 1,2-dichloro-1,1,2-tribromoethane, 1,1-dichloro 1,2,2-tribromoethane, dibromotrifluoroethane, dibromotrichloroethane and fluorodichlorodibromoethane. Suitable compounds of the formula $H_2C_2X_4$ include: tetrachloroethane (both the symmetrical and unsymmetrical isomers), tetrabromoethane (both the symmetrical and unsymmetrical isomers), fluorotrichloroethane, 1-fluoro 1,1,2-tribrompethane, 1-fluoro 1,2,2-tribromoethane, difluorodichloroethane, 1,1-difluoro 1,2-dibromoethane, 1,1-difluoro 2,2-dibromoethane, chlorotribromoethane, 1,1-dichloro 1,2-dibromoethane, 1,2-dichloro 1,2-dibromoethane, 1,1-dichloro 2,2-dibromoethane and bromotrichloroethane.

Mixtures of the described acid precursors can also be employed either in the form of a solution or an admixture. The use of a plurality of discrete slugs of different acid precursors, or mixtures of acid precursors, is also contemplated and in some cases is preferred, as is described more fully hereinbelow.

The selection of a particular acid precursor for use in the method of this invention will depend, inter alia, upon the hydrohalic acid desired, the formation material to be acidized, the temperature and pressure conditions to which the acid precursor will be exposed prior to hydrolysis, and the availability, cost and handling characteristics of the acid precursor.

In general, the halogenated hydrocarbons having one carbon atom are preferred over the halogenated hydrocarbons having two carbon atoms, especially at formation temperatures above about 500° F., because various side reaction products of the hydrolysis of the halogenated hydrocarbons having two carbon atoms, such as acetic acid, can be pyrolyzed to form plugging solid residues at these very high temperatures. Of the halogenated hydrocarbons having one carbon atom, the acid precursors of the formula $CX_4$ are preferred, and tetrachloromethane (i.e., carbon tetrachloride) is particularly preferred due to its ability to hydrolyze readily over the temperature range 250° to 700° F., as well as its low cost and availability.

Hydrochloric acid precursors and acid precursors which reach to form a mixture of hydrochloric acid and other hydrohalic acids are preferred for use in the method of this invention. The preferred hydrochloric acid precursors are tetrachloromethane, trichloromethane, pentachloroethane and tetrachloroethane, with tetrachloromethane being particularly preferred. Preferred acid precursors which hydrolyze to form a mixture of hydrochloric and hydrobromic acids are bromotrichloromethane, chlorodibromomethane, bromodichloromethane, trichlorodibromoethane, 1,1-dichloro 1,2-dibromoethane, 1,2-dichloro 1,2-dibromoethane, and 1,1-dichloro 2,2-dibromoethane. Preferred acid precursors which hydrolyze to form a mixture of hydrochloric and hydrofluoric acids are 1,1,2-trifluorotrichloroethane, fluorotetrachloroethane and fluorotrichloroethane, with 1,1,2-trifluorotrichloroethane being particularly preferred.

In the method of this invention, one or more slugs of a treating fluid consisting essentially of the acid precursor is introduced through a well and into the subterranean formation to be acidized. During its passage through the well, the treating fluid must be in a substantially anhydrous state to avoid premature hydrolysis and the resulting corrosion of the injection equipment. The term "substantially anhydrous" as used herein is meant to include treating fluids having not more than a minor amount of water. The amount of water which can be tolerated in the treating fluid depends primarily upon the temperature to which the treating fluid is heated during its passage through the well. For example, at relatively low treating fluid temperatures, such as temperatures on the order of 250° to 300° F., water concentrations of about 10 weight percent may be acceptable because the acid precursor and water are immiscible and therefore do not hydrolyze readily. However, at relatively high treating fluid temperatures, such as on the order of 500° to 700° F., water concentrations must be less than about 1 weight percent due to the accelerated rate of hydrolysis at these temperatures. For the purposes of this invention, a treating fluid is "substantially anhydrous" when it contains less than the amount of water required to cause a significant amount of hydrolysis during passage through the well, which significant amount results in an unacceptable rate of corrosion of the injection equipment. Best result are obtained when the treating fluid is introduced into the well as an ahydrous liquid.

The introduction of the treating fluid into the subterranean formation can be accomplished by a variety of well-known fluid injection methods, provided that the acid precursor is not prematurely mixed with water. In the method of this invention the substantially anhydrous treating fluid and the fluoride salt solution are injected through a well into the subterranean formation. Both the substantially anhydrous treating fluid and the fluoride salt solution may be introduced through an injection tubing, preferably in the form of a plurality of small, discrete alternating slugs. Because the acid precursors are relatively insoluble in water there will be little mixing and/or hydrolysis during the passage through the injection tubing at these temperatures. Alternatively, a slug of the substantially anhydrous treating fluid may be injected through a water-free injection tubing and the aqueous fluoride salt solution may be injected through the well annulus between the injection tubing and the walls of the borehole. In either case, the injected fluids are preferably displaced from the well into the formation by an inert displacement fluid which is injected through the injection tubing and/or well annulus to over-displace the mixed acid precursor and aqueous solution into the formation. This latter-described procedure is preferred because it provides for mixing of the acid precursor and aqueous solution in the borehole prior to entry into the formation, and yet, because the hydrolysis rate is relatively slow, the hydraulic acid is not produced to any significant extent until the reaction mixture has been displaced well into the formation. Excess water may be injected prior to the displacement fluid to remove any acid precursor remaining in the injection tubing.

The displacement fluid can be any inert fluid, such as nitrogen or an aqueous or oleaginous fluid is noncorrosive and nonplug-forming under the conditions encountered in the injection well. Preferred aqueous displacement fluids contain ammonium chloride, ammonium iodide, ammonium bromide salts or the like which serve to stabilize any water-swellable clays in the formation. Preferred oleaginous displacement fluids are the solvent refined paraffinic lubricating oil base stocks, known as neutral oils and bright stocks, such as are used conventionally in the manufacture of lubricating oils for industrial turbines and other machines operating at high temperatures.

In a preferred embodiment of the method of this invention a high temperature subterranean formation is hydraulically fractured as the acid precursor is hydrolyzing in situ. The technique of fracture-acidizing is well known and therefore need not be described more fully herein except for the following novel features. In a preferred method of fracture acidizing, the substantially anhydrous treating fluid is introduced under pressure through the injection tubing and into the subterranean formation while an aqueous fluoride salt solution which preferably also contains a water-soluble, viscosity-increasing agent is simultaneously injected under pressure through the well annulus and, subsequently, through the injection tubing to displace the acid precursor into the subterranean formation as the formation is being hydraulically fractured. The exposed fracture surfaces provide a hot, clean surface for reaction with the in situ produced acid. Suitable viscosity increasing agents include the thermally stable, water-soluble polymers normally used in hydraulic fracturing, such as polyacrylamides and polyvinylpyrrolidones. As is conventional, propping agents can be injected to hold the newly formed fractures open after the pressure is reduced.

The factors to be considered in selecting the quantity of acid precursor and/or water to be injected in the method of this invention are essentially the same as in a conventional acidization operation. By way of example, an acid treatment which would conventionally call for the use of about 100 gallons of an acid solution containing 12 weight percent hydrochloric acid and 3 weight percent hydrofluoric acid per foot of perforated interval, requires the injection of about 12.2 gallons of tetrachloromethane and, in a relatively water-free formation, about 100 gallons of a 5.5 weight percent aqueous ammonium fluoride solution. In a water-containing formation, the volume of the fluoride salt solution to be injected may be reduced and a higher concentration of the fluoride salt employed to from the desired concentration of hydrofluoric acid upon dilution with the connate water. The design of a particular acidization operation using the method of this invention will therefore become obvious to those skilled in the art from these well known factors when taken in view of this disclosure.

In a highly preferred embodiment of the method of this invention, a preflush fluid is injected prior to the treating fluid and fluoride salt solution. The preflush fluid consists essentially of an acid precursor which hydrolyzes to form hydrochloric acid, hydrobromic acid, hydroiodic acid or a mixture thereof. Suitable preflush fluids include tetrachloromethane, trichloromethane, pentachloroethane, tetrachloroethane, bromotrichloromethane, chlorodibromomethane, bromodichloromethane, trichlorodibromoethane, dichlorodibromoethane, and mixtures thereof. The preflush fluid is allowed to hydrolyze in situ and react with the formation before the treating fluid and fluoride salt solution are injected. The function of the acid produced by hydrolysis of the preflush fluid is (1) to provide a low pH environment relatively free of cations which would otherwise form insoluble fluoride or fluosilicate salts, such as calcium fluoride and sodium fluosilicate, respectively, with the subsequently produced hydrofluoric acid, and (2) to consume carbonates and other highly reactive, nonsiliceous materials in the formation thereby conserving the later-introduced hydrofluoric acid for reaction with the siliceous materials to be acidized.

After the preflush acid has solubilized the nonsiliceous materials, the solubilized materials should be removed from the portion of the formation which is to be acidized by the subsequently injected fluids. The removal may be accomplished by injecting a displacement fluid to overdisplace the solubilized materials deep into the formation, or, alternatively, the solubilized materials may be produced through the well.

Whenever the formation to be acidized by a method fo this invention contains water-swellable clays, care must be taken to avoid swelling these clays, which swelling could result in severely reducing the permeability of the formation. Various methods are known for avoiding clay swelling. In particular any aqueous solutions injected before or during the acidization operation should contain an agent, such as ammonium chloride, to prevent clay swelling.

An inert gas, such as nitrogen, can be added to the fluids injected in the method of this invention to aid in the mixing of the acid precursor and water in the formation. Between about 50 and about 5,000 standard cubic feet of the inert gas per barrel of the injected fluid is preferred, and good results are obtained when about 1,000 standard cubic feet of nitrogen per barrel of fluid is employed.

After displacement of the injected fluids into the formation, the well is shut in for a preselected time to allow the acid precursor to hydrolyze and the in situ-produced acid to be consumed in the desired acidization of formation materials. The degree of hydrolysis achieved in situ is determined by the length of time the well is shut in. When less than complete hydrolysis is achieved, precautions must be taken to handle the unreacted acid precursor and any noxious intermediate reaction products. After the preselected period, the borehole is preferably flushed with a conventional well cleaning fluid, such as water, and the well effluent is contacted in a pit or other contacting device with a dilute ammonium hydroxide solution for a short time prior to returning the well to its normal injection or production operation.

The degree of hydrolysis achieved in a preselected period of time will depend, inter alia, upon the particular acid precursor, and the temperature and pressure conditions in the formation. The rate of hydrolysis generally increases with increases in temperature and/or pressure. In formations having temperatures between about 250° F. and about 350° F., at least about 50 percent hydrolysis is desired, preferably at least about 80 percent hydrolysis. In these formations, less than complete hydrolysis will normally be employed, as a practical matter, due to the long shut-in period required for complete hydrolysis. The quantity of acid precursor injected must, of course, be larger at these lower degrees of hydrolysis in order to provide the same yield of hydrohalic acid. In higher temperature formations, substantially complete hydrolysis can be achieved within a relatively short time period, such as less than 48 hours, and is therefore preferred. The time required for any desired degree of hydrolysis can be determined in the laboratory by a simple test which is described below in the determination of the time required for complete hydrolysis of tetrachloromethane.

A series of tests are performed to determine the time required for complete hydrolysis of tetrachloromethane at about 350° F. Approximately 1 gram of tetrachloromethane, 15 grams of deionized water and a calcium carbonate chip weighing about 2.6 grams are placed in a glass test tube and the test tube is sealed. The sealed tube is placed inside a cylindrical autoclave having an internal dimension slightly larger than the external dimensions of the sealed tube. The autoclave is pressurized with nitrogen to about 1,200 p.s.i.g. The contents of the autoclave are heated rapidly, e.g., at a rate of 50° F. per minute, up to 350° F. and then held at this temperature for varying preselected periods of time. At this temperature, the pressure inside the sealed tube is approximately 1000 p.s.i.g. At the end of the preselected time period, the contents of the autoclave are rapidly cooled to room temperature by circulating nitrogen through the autoclave. The glass tube is broken to recover the unreacted calcium carbonate chip for weighing. Calculating from the equation which represents the overall hydrolysis-acidization reaction:

$$CCl_4 + 2CaCO_3 \rightarrow 2CaCl_2 + 3CO_2$$

the weight loss expected for 100 percent hydrolysis of the 1 gram of tetrachloromethane is about 1.3 grams. The test in which the autoclave contents are maintained at 350° F. for 44 hours indicates complete hydrolysis of the tetrachloromethane. Similar series of tests are conducted for 400° F. and 500° F., and the time required for complete hydrolysis under these conditions is found to be about four hours and one hour, respectively.

If the rate of hydrolysis of a selected acid precursor is too rapid for a particular acidizing treatment, a retarder may be incorporated into the treating fluid to retard the hydrolysis reaction. The retarder should be nonpolymerizable and nonpyrolyzable under the high temperature and pressure conditions in the formation, and should be nonreactive with the formation constituents and the in situ-produced acid. Suitable retarders include the solvent refined, paraffinic lubricating oil base stocks, known as neutral oils and bright stocks. Preferred retarders are the highly paraffinic "white oils" which are acid refined from these base stocks. Exemplary retarders and their properties are as follows:

| Retarder | Gravity °API | Nominal Boiling Point Range (°F.) | Viscosity (SSU) |
|---|---|---|---|
| 90 Neutral Oil | 30.8 | 640–790 | 90 @ 100° F. |
| 300 Neutral Oil | 27.7 | 710–980 | 300 @ 100° F. |
| 175 Bright Stock | 24.3 | 800–plus | 175 @ 210° F. |

These base stocks typically are between 70 and 90 percent saturated hydrocarbons with the balance being aromatic hydrocarbons. White oils are even more highly paraffinic.

Normally only very high temperature formations, such as geothermal formations having temperatures between about 500° F. and about 700° F. will require the use of a retarder. However, use of a retarder in acidizing other subterranean formations having temperatures above about 400° F. is contemplated. When a retarder is required, the treating fluid injected through the well into the formation in the method of this invention will consist essentially of a mixture of the retarder and the acid precursor. Exemplary treating fluids are mixtures consisting of from about 50 to 95 weight percent acid precursor with the balance being the retarder. The amount of retarder required for a particular acidization treatment is easily determined by repeating the aforementioned test for determining the time required for the desired degree of hydrolysis with differing amounts of retarder. For example, the time required for complete hydrolysis of a treating fluid consisting of 1 gram of a neutral oil marketed by Union Oil Company of California under the name Union 300 Neutral Oil and 1 gram of tetrachloromethane when mixed with 15 milliliters of a 3 weight percent NaCl solution was determined by this test to be between 16 and 20 hours at 400° F. as compared to less than 6 hours for tetrachloromethane in a 3 weight perent NaCl solution without the retarder.

The rate of hydrolysis of the acid precursor can also be retarded by increasing the salt concentration of the aqueous fluid with which it reacts in situ to generate the hydrohalic acid. For example, at 400° F. the complete hydrolysis of tetrachloromethane requires about six hours in a 3 weight percent NaCl solution as compared to only about four hours in fresh water. The total salt content of the aqueous fluoride salt solution, i.e., the fluoride salt plus other salts, may be adjusted between about 2 and about 30 weight percent to control the rate of hydrolysis of the acid precursor. Preferably ammonium chloride, ammonium bromide, ammonium iodide or mixtures thereof are used, as required, to retard the rate of hydrolysis of the acid precursor. When the well is shut in to allow hydrolysis of the acid precursor a spacer fluid containing a retarder, such as a 30 weight percent solution of ammonium chloride, is preferably positioned in the well adjacent to the formation to be acidized in order to substantially prohibit hydrolysis of any acid precursor remaining in contact with the well.

Primary advantages realized in the method of this invention result from the fact that the acid precursors and aqueous fluoride salt solutions employed are noncorrosive under the high temperature conditions encountered prior to hydrolysis in the formation. To demonstrate the noncorrosivity of the anhydrous acid precursors, a series of tests are performed to determine the rate of corrosion of tetrachloromethane at a variety of high temperatures. Anhydrous tetrachloromethane and a weighed corrosion test specimen of N-80 steel are placed in a glass tube which is then sealed. The sealed tube is placed in an autoclave and is heated to a preselected high temperature for a selected period of time, after which it is cooled to 100° F. for the balance of 22 hours. The test specimen is then removed from the glass tube and weighed. The weight loss is converted to pounds per square foot of surface area. A weight loss of about 0.050 pounds per square foot is considered the maximum acceptable rate. Results of this series of tests are as follows:

| Temperature (° F.) | Time (Hours) | Corrosion Rate (pounds/sq. foot) |
|---|---|---|
| 400 | 6 | 0.002 |
| 600 | 6 | 0.005 |
| 650 | 6 | 0.015 |
| 650 | 6 | 0.021 |
| 700 | 4 | 0.012 |
| 700 | 6 | 0.029 |

This data indicates that metal surfaces exposed to anhydrous tetrachloromethane prior to hydrolysis in the method of this invention will not be corroded to any signficant extent. Accordingly, the method of this invention is suitable for the acidization of subterranean formations having temperatures much higher than the 250° F. practical maximum temperature of the prior art acidization methods.

The invention is further illustrated by the following example which is illustrative of a specific mode of practicing the invention and is not intended as limiting the scope of the invention as defined by the appended claims.

EXAMPLE

A subterranean formation contains a geothermal fluid at a temperature of about 450° F. A steam-producing zone of the formation is penetrated by a production well at a depth of about 5,500 feet, and is fracture-acidized in accordance with the method of this invention.

First, a 20-barrel slug of a 5 weight percent ammonium chloride solution followed by an 80-barrel slug of fresh water are injected through the well into the formation in order to stabilize any clay contained thereon. A volume of the formation around the well is then preflushed to remove nonsiliceous acid-soluble materials by alternately injecting through the well and into the formation ten 3.5-barrel slugs of tetrachloromethane and ten 35-barrel slugs of fresh water. The injected fluids mix in a mixing zone of the well to form a preflush mixture which is then displaced into the formation by the later-injected fluids. A 20-barrel slug of fresh water is injected to displace the preflush mixture away from the well and a 20-barrel slug of a 15 weight percent ammonium chloride solution is positioned in the well adjacent the producing zone to protect the well from the hydrochloric acid produced upon hydrolysis of the tetrachloromethane.

The preflush tetrachloromethane hydrolyzes in situ to generate hydrochloric acid which solubilizes nonsiliceous acid-soluble materials in the formation. The later-injected fluids will displace these solubilized materials away from the volume of the formation surrounding the well.

After an appropriate period of time to allow about 80 percent hydrolysis of the preflush acid precursor, such as about one hour or less, fifty 6.5-barrel slugs of tetrachloromethane and fifty 50-barrel slugs of an aqueous solution containing 5.5 weight percent of ammonium fluoride and 1,000 ppm of polyacrylamide polymer marketed by The Dow Chemical Company under the trademark Pusher ® 1000 are injected through the well into the formation at a rate sufficient to hydraulically fracture the steam-producing zone of the formation. The injected fluids mix in the mixing zone of the well to form a reaction mixture which is then displaced into the formation. A 20-barrel slug of fresh water is injected to displace the last of the reaction mixture away from the well, and a 20-barrel slug of a 30 weight percent solution of ammonium chloride is positioned in the well adjacent the formation to protect the well.

The well is shut in for about two hours to allow substantially complete hydrolysis of the acid precursor and substantially complete reaction of the hydrofluoric acid produced in situ. Thereafter, the well is brought back on production.

While particular embodiments of the invention have been described, it will be understood, of course, that the invention is not limited thereto since many obvious modifications can be made, and it is intended to include within this invention any such modifications as will fall within the scope of the appended claims.

Having now described the invention, I claim:

1. A method for acidizing siliceous materials contained in a subterranean formation having a temperature above about 250° F., which comprises:
   (a) introducing into a well communicating with said formation (1) a noncorrosive aqueous solution containing a water-soluble alkali metal or ammonium fluoride salt, and (2) a substantially anhydrous treating fluid consisting essentially of a first normally liquid acid precursor having a generalized formula:

$C_xH_yX_z$ wherein
x = 1 or 2;
y = 0, 1 or 2, but y ≦ x; and
z = 2x − y + 2, and
which is thermally stable under the temperature and pressure conditions to which it is exposed in said well, or mixtures thereof; and (b) displacing said aqueous solution and said treating fluid from said well and into said formation wherein said acid precursor hydrolyzes in situ to generate a hydrohalic acid which combines with said fluoride salt to acidize said siliceous materials.

2. The method defined in claim 1 wherein, during step (a), said aqueous solution is introduced through a first passageway of said well into a mixing zone of said well which is adjacent to said formation and said treating fluid is introduced through a second passageway of said well into said mixing zone to therein mix with said aqueous solution to form a reaction mixture, and wherein said reaction mixture is displaced into said formation during step (b).

3. The method defined in claim 2 wherein said second passageway is a substantially water-free tubing string disposed is said well.

4. The method defined in claim 3 wherein said formation contains an aqueous geothermal fluid having a temperature between about 400° F. and about 700° F. and wherein said treating fluid is maintained in an anhydrous state until it is mixed with said aqueous solution in said mixing zone.

5. The method defined in claim 1 wherein, during step (a), at least one discrete slug of said aqueous solution and at least one discrete slug of said treating fluid are introduced through a single passageway of said well into a mixing zone of said well which is adjacent to said formation.

6. The method defined in claim 1 further comprising the steps of, prior to step (a), introducing through said well and into said formation a substantially anhydrous preflush fluid consisting essentially of a second normally liquid acid precursor having a generalized formula:

$$C_xH_yX_z$$

wherein
x = 1 or 2;
y = 0, 1 or 2, but y ≦ x;
z = 2x − y + 2; and
X is selected from Cl, Br and/or I, and
which is thermally stable under the temperature and pressure conditions to which it is exposed in said well, or mixtures thereof; and allowing said second acid precursor to hydrolyze in situ to form a preflush hydrohalic acid.

7. The method defined in claim 6 wherein said second acid precursor is selected from the group consisting of tetrachloromethane, trichloromethane, pentachloroethane, tetrachloroethane, bromotrichloromethane, chlorodibromomethane, bromodichloromethane, trichlorodibromoethane, dichlorodibromoethane and mixtures thereof.

8. The method defined in claim 1 wherein said alkali metal or ammonium fluoride salt is selected from the group consisting of ammonium fluoride, ammonium bifluoride, ammonium fluoroborate, ammonium hexafluorophosphate, ammonium difluorophosphate, ammonium fluorosulfonate, cesium fluoride, cesium bifluoride, cesium hexafluorophosphate, cesium difluorophosphate, cesium fluorosulfonate and mixtures thereof.

9. The method defined in claim 1 wherein said first acid precursor is selected from the group consisting of tetrachloromethane, fluorotrichloromethane, bromotrichloromethane, dibromodichloromethane, trichloromethane, tribromomethane, chlorodibromomethane, bromodichloromethane, iododibromomethane, chlorodiiodomethane, iododichloromethane, fluorochlorobromomethane, 1,2-difluorotetrachloroethane, 1,1,2-trifluorotrichloroethane, 1,1,2-trifluorotribromoethane, pentachloroethane, fluorotetrachloroethane, fluorotetrabromoethane, difluorotribromoethane, 1,2-dichloro 1,1,2-tribromoethane, 1,1-dichloro 1,2,2-tribromoethane, dibromotrifluoroethane, dibromotrichloroethane, fluorodichlorodibromoethane, tetrachloroethane, tetrabromoethane, fluorotrichloroethane, 1-fluoro 1,1,2-tribromoethane, 1-fluoro 1,2,2-tribromoethane, difluorodichloroethane, 1,1 -difluoro 1,2-dibromoethane, 1,1 -difluoro 2,2-dibromoethane, chlorotribromoethane, 1,1 -dichloro 1,2-dibromoethane, 1,2-dichloro 1,2-dibromoethane, 1,1-dichloro 2,2-dibromoethane, bromotrichloroethane, and mixtures thereof.

10. The method defined in claim 1 wherein said first acid precursor is selected from the group consisting of tetrachloromethane, trichloromethane, pentachloroethane, tetrachloroethane, bromotrichloromethane, chlorodibromomethane, bromodichloromethane, trichlorodibromoethane, dichlorodibromoethane, 1,1,2-trichlorotrifluoroethane, fluorotetrachloroethane, fluorotrichloroethane and mixtures thereof.

11. The method of claim 1 wherein said first acid precursor is tetrachloromethane.

12. The method defined in claim 1 wherein said fluoride salt is an ammonium fluoride salt and wherein said method further comprises, prior to the completion of step (b), maintaining said aqueous solution under sufficient pressure to prohibit the evolution of ammonia therefrom.

13. A method for acidizing siliceous materials contained in a subterranean hydrocarbon-bearing formation having a temperature above about 250° F., which comprises:

(a) introducing a substantially anhydrous preflush fluid through a tubing string disposed in a well and into a mixing zone of the well adjacent said formation, said preflush fluid consisting essentially of an acid precursor selected from the group consisting of tetrachloromethane, trichloromethane, pentachloroethane, tetrachloroethane, bromotrichloromethane, chlorodibromomethane, bromodichloromethane, trichlorodibromoethane, dichlorodibromoethane and mixtures thereof;

(b) introducing an aqueous fluid into said mixing zone, wherein said acid precursor and said aqueous fluid mix to form a preflush mixture;

(c) displacing said preflush mixture from said mixing zone and into said formation and allowing said first acid precursor to hydrolyze in situ to generate a preflush hydrohalic acid which dissolves nonsiliceous, acid-soluble materials from said formation;

(d) removing the dissolved nonsiliceous materials from at least a portion of said formation surrounding said well;

(e) thereafter introducing (1) a noncorrosive aqueous solution containing a fluoride salt selected from the group consisting of ammonium fluoride, ammonium bifluoride, ammonium fluoroborate, ammonium hexafluorophosphate, ammonium difluorophosphate, ammonium fluorosulfonate, cesium fluoride, cesium bifluoride, cesium hexafluorophosphate, cesium difluorophosphate, cesium fluorosulfonate and mixtures thereof, and (2) a substantially anhydrous treating fluid consisting essentially of a second acid precursor selected from the group consisting of tetrachloromethane, trichloromethane, pentachloroethane, tetrachloroethane, bromotrichloromethane, chlorodibromomethane, bromodichloromethane, trichlorodibromoethane, dichlorodibromoethane, 1,1,2-trichlorotrifluoroethane, fluorotetrachloroethane, fluorotrichloroethane and mixtures thereof, through said well and into said mixing zone wherein said aqueous solution and said treating fluid mix to form a reaction mixture; and (f) displacing said reaction mixture from said mixing zone and into said formation wherein said second acid precursor hydrolyzes in situ to generate a hydrohalic acid which combines with said fluoride salt to acidize said siliceous materials.

14. The method defined in claim 13 wherein said first and second acid precursors are tetrachloromethane.

15. The method defined in claim 13 wherein a plurality of discrete slugs of said preflush fluid are introduced alternately with at least one discrete slug of said aqueous fluid through said tubing string and into said mixing zone to thereby form said preflush mixture.

16. The method of claim 13 wherein a plurality of discrete slugs of said treating fluid are introduced alternately with discrete slugs of said aqueous solution through said tubing string and into said mixing zone to thereby form said reaction mixture.

17. The method defined in claim 13 wherein said aqueous fluid and said aqueous solution are introduced, during steps (b) and (e), respectively, into said mixing zone through the annulus between said tubing string and the walls of said well.

18. The method defined in claim 13 further comprising the step of applying a high pressure to the injected fluid during step (e) to thereby hydraulically fracture the formation as it is being acidized.

19. The method defined in claim 13 wherein said fluoride salt is ammonium fluoride.

20. A method for acidizing siliceous materials contained in a subterranean formation which has a temperature between about 400° F. and about 700° F. and which contains an aqueous geothermal fluid, said method comprising:

(a) introducing an anhydrous preflush fluid through a tubing string disposed in a well into a zone of said well adjacent said formation, said treating fluid consisting essentially of a first acid precursor selected from the group consisting of tetrachloromethane, trichloromethane, pentachloroethane, tetrachloroethane, bromotrichloromethane, chlorodibromomethane, bromodichloromethane, trichlorodibromoethane, dichlorodibromoethane, and mixtures thereof;

(b) displacing said preflush fluid from said zone and into said formation, and allowing said first acid precursor to hydrolyze in situ to generate a preflush hydrohalic acid which dissolves nonsiliceous, acid-soluble materials from said formation;

(c) removing the dissolved nonsiliceous materials from at least a portion of said formation surrounding said well;

(d) thereafter introducing (1) a noncorrosive aqueous solution containing a fluoride salt selected from the group consisting of ammonium fluoride, ammonium bifluoride, ammonium fluoroborate, ammonium hexafluorophosphate, ammonium difluorophosphate, ammonium fluorosulfonate, cesium fluoride, cesium bifluoride, cesium hexafluorophosphate, cesium difluorophosphate, cesium fluorosulfonate and mixtures thereof, and (2) a substantially anhydrous treating fluid consisting essentially of a second acid precursor selected from the group consisting of tetrachloromethane, trichloromethane, pentachloroethane, tetrachloroethane, bromotrichloromethane, chloridibromoethane, bromodichloromethane, trichlorodibromoethane, dichloridibromoethane, 1,1,2-trichlorotrifluoroethane, fluorotetrachloroethane, fluorotrichloroethane and mixtures thereof, through said well and into said zone wherein said aqueous solution and said treating fluid mix to form a reaction mixture; and (e) displacing said reaction mixture from said mixing zone and into said formation wherein said second acid precursor hydrolyzes in situ to generate a hydrohalic acid which combines with said fluoride salt to acidize said siliceous materials.

21. The method defined in claim 20 wherein said first and second acid precursors are tetrachloromethane.

22. The method defined in claim 20 wherein the concentration of said fluoride salt in said aqueous solution is selected such that the concentration of fluoride ion in said reaction mixture upon dilution by said geothermal fluid is between about 1 and about 10 weight percent.

23. The method defined in claim 20 including the step of simultaneously applying a high pressure to the injected fluid during step (d) to thereby hydralically fracture the formation as it is being acidized.

24. A method for acidizing siliceous materials contained in a subterranean formation having a temperature above about 400° F., which comprises:

introducing into a well communicating with said formation (a) a noncorrosive aqueous solution containing a water-soluble alkali metal or ammonium fluoride salt, and (b) a substantially anhydrous treating fluid consisting essentially of (1) a normally liquid acid precursor having a generalized formula:

wherein
x = 1 or 2;
y = 0, 1 or 2, but y ≦ x; and
z = 2x − y + 2, and which is thermally stable under the temperature and pressure conditions to which it is exposed in said well, or mixtures thereof and (2) a solvent refined, paraffinic lubricating oil base stock, or an acid-refined derivative thereof, comprised of at least about 70 percent saturated hydrocarbons having normal boiling points above about 640° F.; and displacing said aqueous solution and said treating fluid from said well and into said formation wherein said acid precursor hydrolyzes in situ to generate a hydrohalic acid which combines with said fluoride salt solution to acidize said siliceous materials.

25. The method defined in claim 24 wherein said acid precursor is selected from the group consisting of tetrachloromethane, trichloromethane, pentachloroethane, tetrachloroethane, bromotrichloromethane, chlorodibromomethane, bromodichloromethane, trichlorodibromoethane, dichlorodibromoethane, 1,1,2-trichlorotrifluoroethane, fluorotetrachloroethane, fluorotrichloroethane, and mixtures thereof.

26. The method defined in claim 24 wherein said subterranean formation has a temperature between about 500° F. and about 700° F. and contains an aqueous geothermal fluid.

27. The method defined in claim 24 wherein said treating fluid consists of from about 50 to about 95 weight percent of said acid precursor with the balance being said solvent refined, paraffinic lubricating oil base stock, or said acid-refined derivative thereof.

28. The method defined in claim 24 wherein said acid precursor is tetrachloromethane.

29. The method defined in claim 24 wherein said fluoride salt is selected from the group consisting of ammonium fluoride, ammonium bifluoride, ammonium fluoroborate, ammonium hexafluorophosphate, ammonium difluorophosphate, ammonium fluorosulfonate, cesium fluoride, cesium bifluoride, cesium hexafluorophosphate, cesium difluorophosphate, cesium fluorosulfonate and mixtures thereof.

* * * * *